Patented Nov. 14, 1922.

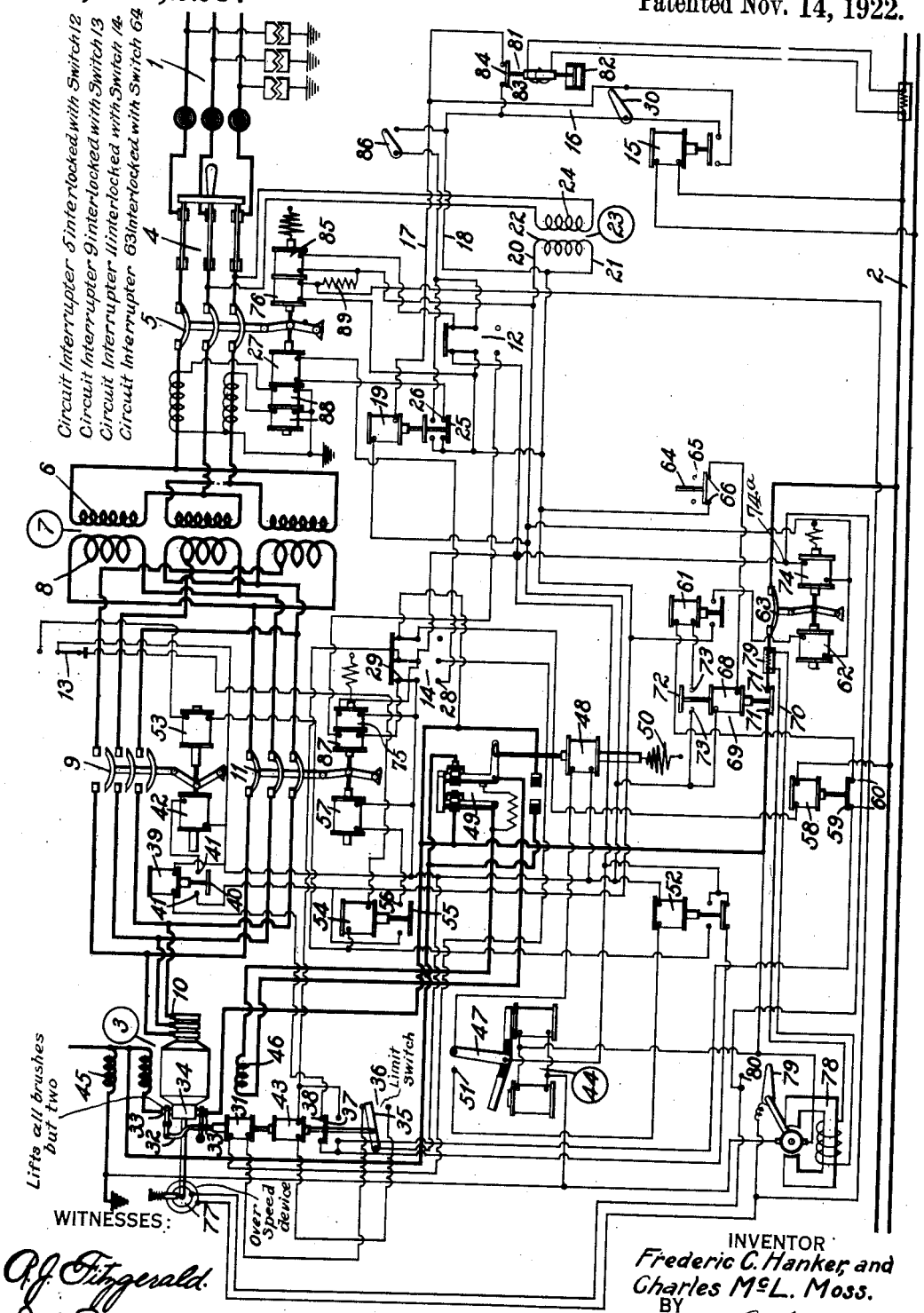

1,435,229

UNITED STATES PATENT OFFICE.

FREDERIC C. HANKER, OF WILKINSBURG, AND CHARLES McL. MOSS, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRICAL SYSTEM. REISSUED

Application filed September 27, 1916. Serial No. 122,377.

*To all whom it may concern:*

Be it known that we, FREDERIC C. HANKER, a citizen of the United States, and a resident of Wilkinsburg, in the county of Allegheny and State of Pennsylvania, and CHARLES McL. Moss, a citizen of the United States, and a resident of Pittsburgh, in the county of Allegheny and State of Pennsylvania, have invented a new and useful Improvement in Electrical Systems, of which the following is a specification.

Our invention relates to electrical systems and particularly to such systems in which a converter or other similar device is adapted to be automatically started and controlled for the purpose of supplying energy to a circuit, under predetermined conditions.

One object of our invention is to provide a system of the above indicated character that shall have a plurality of relay-controlled circuit interrupters for automatically starting and connecting a converter to a circuit, under predetermined conditions.

Another object of our invention is to provide means whereby an interpole rotary converter may be automatically started, under predetermined conditions.

Another object of our invention is to provide means whereby the polarity of a converter may be accurately and automatically controlled.

Another object of our invention is to provide a system of the above indicated character that shall have a plurality of relay-controlled interlocked circuit interrupters for effecting the automatic starting and stopping of the converter.

A further object of our invention is to provide a system of the above indicated character that shall be simple to construct and efficient in its operation.

In the carrying out of our invention, we provide a plurality of relay-controlled interlocked circuit interrupters for automatically starting a rotary converter and a polarized relay for so controlling a field-winding reversing switch that the correct polarity of the converter is assured before it is connected to the direct-current circuit. We further provide a relay dependent upon the difference in voltage between the converter and the direct-current circuit for controlling the connection therebetween.

The single figure of the accompanying drawing is a diagrammatic view of an electrical system embodying our invention.

An electrical system, in which our invention is embodied, comprises an alternating-current circuit 1, a direct-current circuit 2 and a rotary or synchronous converter 3 connected therebetween. It is frequently desirable to cause the converter 3 to be started and stopped in accordance with predetermined load and voltage conditions in the direct-current circuit 2. If the converter 3 is located a relatively great distance from the source of alternating current, it is desirable that the starting and stopping of the converter be accomplished by automatic means and, in so doing, the overhead cost of operating the substation will be relatively small. That is, if the converter 3 can be caused to operate only when a predetermined load is connected to the direct-current circuit, it will be understood that the only losses in the substation will obtain when the rotary converter is supplying energy.

The conductors of the circuit 1 are operatively connected through a disconnecting switch 4 and a circuit interrupter 5 to the terminals of the primary winding 6 of a transformer 7. The low-potential taps of the secondary winding 8 of the transformer 7 are operatively connected, through a circuit interrupter 9, to the collector brushes 10 of the converter 3, and, similarly, the relatively high-potential taps of the secondary winding 8 of the transformer 7 are connected, through a circuit interrupter 11, to the collector brushes 10 of the converter 3. Thus, when the interrupters 5 and 9 are closed, the alternating-current end of the rotary converter 3 will be supplied with alternating current at a relatively low potential, and, when the interrupter 9 is opened and the interrupter 11 is closed, the alternating-current end of the converter 3 will be supplied with alternating current at a relatively high, or the correct, operating potential.

The circuit interrupter 5 is provided with a relatively small double-pole double-throw control switch 12 that is adapted to be so interlocked with the interrupter 5, that, when the interrupter is closed, it will assume one position and, when the interrupter is opened, it will assume its other position. The interrupter 9 is provided with a single-pole, double-throw control switch 13 that is so interlocked therewith that it will assume the one or the other of its positions in accordance with the position of the circuit interrupter 9. Similarly, the circuit interrupter 11 is provided with a three-pole, double-throw control switch 14 with which it is so interlocked as to assume various positions in accordance with the positions of the interrupter.

A voltage relay 15 is connected across the direct-current circuit 2 for the purpose of causing the interrupter 5 to be closed when the voltage across the circuit 2 drops to a predetermined relatively low value. That is, if the circuit 2 represents a section of a direct-current railway circuit, it is advisable to supply energy to that circuit only when a car or locomotive is traversing the same. Thus, when the locomotive is receiving energy from the circuit 2, the voltage thereacross will drop and the relay 15 will complete a circuit 16 that comprises a conductor 17, a conductor 18 and the operating winding of an electromagnetic switch 19. The conductors 17 and 18 are operatively connected to the terminals 20 and 21 of the secondary winding 22 of a transformer 23, the primary winding 24 of which is connected to the circuit 1. When the relay 15 operates, the operating winding of the switch 19 will be energized and its bridging contact member 25 will engage its stationary contact members 26 for the purpose of completing a circuit from the terminal 21 of the transformer 23 through the closing coil 27 of the interrupter 5, the stationary contact member 28 and the movable contact member 29 of the switch 14 to the other terminal 20 of the transformer 23. Consequently, when the relay 15 operates, the circuit interrupter 5 is closed. A switch 30 is provided that may be either hand-operated or controlled by a clock or other suitable means for effecting the closure of the circuit interrupter 5, under predetermined conditions.

When the circuit interrupter 5 is closed, its control switch 12 will assume the position shown in the drawing, whereby the winding 31 of a brush-lifting device 32 is energized for the purpose of raising the brushes 33 from the commutator cylinder 34. That is, a circuit is completed from the terminal 21 of the transformer 23 through the switch 12, the switch 14, the winding 31 of the brush-lifting device 32 and the movable contact member 35 of a switch 36, that is actuated by the brush-lifting device 32, to the terminal 20 of the transformer 23. Thus, as soon as the circuit interrupter 5 is closed, its switch 12 so controls the energization of the electromagnet 31 as to raise all except two of the brushes 33 from the commutator cylinder 34. When the brush-lifting device 32 thus operates, its movable bridging contact member 37 engages stationary contact members 38ª for the purpose of completing a circuit from the terminal 21 of the transformer 23 through the switch 12, the switch 52 and the operating winding of a switch 39 to the terminal 20 of the transformer 23. Thus, as soon as certain of the brushes 33 (not shown) are raised from the commutator cylinder 34, the switch 39 is caused to operate. The movable bridging contact member 40 of the switch 39 is adapted to engage stationary contact members 41 for the purpose of completing a circuit through the closing coil 42 of the circuit interrupter 9. Hence, as soon as certain of the brushes are raised from the commutator cylinder, the circuit interrupter 9 is closed and alternating current of relatively low potential is delivered to the converter 3.

Since one brush of each polarity remains on the commutator cylinder when certain of the brushes 33 are raised, a polarized relay 44, that is connected across the brushes of the rotary converter 3, that are not raised will cause its movable contact member 47 to indicate the polarity of the rotary converter 3. When no voltage is impressed on the relay 44 and when a momentary alternating current traverses the same, the movable contact member 47 is adapted to remain in its neutral or mid position. However, after the direct-current voltage is built up in the converter, if its polarity is reversed, the relay 44 will cause its movable contact member 47 to establish a circuit through the operating coil 48 of a field-reversing switch 49 that is normally held in the position, as shown in the drawing, by a spring 50. Thus, the switch 49 is adapted to reverse the direction of flow of current through the field winding 46 until the direct-current voltage passes through its zero position or slips a pole, and, when such conditions obtain, the relay 44 will reverse and permit the switch 49 to return to its initial position. In this manner, the correct polarity of the converter 3 is assured under all conditions.

If the movable contact member 47 of the relay 44 engages its stationary contact member 51, which may be assumed to be in position for the correct polarity of the converter 3, an electromagnetic switch 52 will be operated for the purpose of completing the circuit through the tripping electromagnet 53 of the interrupter 9. If the polarity of the converter 3 is correct, the interrupter 9 will be opened and its control switch 13 will cause an electromagnetic switch 54 to be energized which, in turn, will cause its bridging contact member 55 to engage its stationary contact members 56 for the purpose of energizing the closing coil 57 of the interrupter 11. When the closing coil 57 is energized, the interrupter 11 will be closed and its control switch 14 will be thrown into the position shown in the drawing. When the switch 14 is operated, a circuit is completed through the winding 43 of the brush-lifting device 32 for the purpose of lowering the brushes 33 and also the circuit through the operating or closing coil 27 of the interrupter 5 is open-circuited.

A single winding relay 58 is operatively connected from one conductor of the circuit 2, through the switch 14, to one of the brushes 33 of the converter 3. When the difference in voltage between the converter 3 and the circuit 2 is a relatively small amount, the movable contact member 59 of the relay 58 will engage its stationary contact members 60 for the purpose of completing a circuit from the terminal 20 of the transformer 22, through the contact members 72 and 73, which are normally in engagement, the winding of the relay 61, the contact members 59 and 60 of the relay 58, the contact members of the relay 52, and the switch 12, to the terminal 21 of the transformer. When the operating winding of the switch 61 is energized, it causes its contact members to complete the circuit of the closing coil 62 of a circuit interrupter 63 that is connected between the terminals of the converter 3 and the circuit 2. When the circuit interrupter 63 is closed, it causes the movable contact member 65 of its auxiliary switch 64 to engage its stationary contact members 66. When the auxiliary switch 64 is closed, the actuating coil 68 of a switch 69 is energized for the purpose of causing its movable contact member 70 to engage its stationary contact members 71 to complete the circuit from the converter 3 to the circuit 2. The switch 69 is provided also with a movable contact member 72 that is adapted to normally engage stationary contact members 73 for the purpose of de-energizing the winding of the electromagnetic switch 61 after the circuit interrupter 63 is closed.

The circuit interrupter 63 is provided with a low-voltage trip coil 74 that is operatively connected, through the switch 12 of the circuit interrupter 5, to the respective terminals of the transformer 23. Thus, when the voltage falls on the alternating-current circuit 1, the circuit interrupter 63 will be tripped and, since the circuit interrupter 11 is also provided with a low-voltage trip coil 75 which is connected in parallel with the low-voltage trip coil 74, it will be understood that, when the voltage falls on the circuit 1, the circuit interrupters 11 and 63 will be tripped. Similarly, the circuit interrupter 5 is provided with a low-voltage trip coil 76 that is connected to the transformer 23 for the purpose of tripping the interrupter 5 when the voltage on the circuit 1 decreases to a predetermined value.

The converter 3 is provided with an over-speed device 77 that is adapted to establish a closed-circuit connection around the low-voltage trip coil 76 when the speed of the converter 3 exceeds a predetermined value. This will cause the circuit interrupter 5 to be tripped and the switch 12 to be opened, whereupon the low voltage coils 75 and 74 of the circuit interrupters 11 and 63, respectively, will be de-energized and the interrupters 11 and 63 will open.

A reverse-energy relay 78 is connected to the terminals of a current shunt 79 and to the terminals of the converter 3 and is provided with a movable contact member 79 that is adapted to engage a stationary contact member 80 for the purpose of close-circuiting the terminals of the trip coil 76 when the energy traversing the connection between the circuit 2 and the converter 3 reverses from its normal direction. That is, if the converter 3 tends to operate as a motor, it is advisable to disconnect the same from the circuit.

Since it is desirable to disconnect the converter 3 when the load traversing the circuit 2 is less than a predetermined value, we provide a current relay 81 that is adapted to maintain the circuit 16 closed when a predetermined current traverses the same. The relay 81 is provided with a time-element device 82 in order that, when the load traversing the circuit 2 falls below a predetermined value, its movable bridging contact member 83 will disengage its stationary contact member 84 a predetermined time after the load on the circuit 2 falls to a predetermined value to cause the de-energization of the operating winding of the switch 19 and the energization of the tripping coil 85 of the circuit interrupter 5. A switch 86, that may be either hand-operated or automatically controlled from some distant point, is provided for controlling the circuit of the tripping coil 85 in order that the circuit interrupter 5 may be manually or automatically opened under any condition.

Since the relays 15 and 81 have their contact members connected in parallel, it is understood that the circuit interrupter 5 may be opened when the load traversing the circuit 2 falls below a predetermined value for a predetermined period of time and when the voltage of the circuit 2 is greater than a predetermined value. The time-element device 82 of the relay 81 is so proportioned that it will permit sufficient time to elapse between the decreasing of the energy traversing the circuit 2 and the separation of the contact members 83 and 84 in order that a temporary decrease in load may occur when a locomotive stops to discharge passengers or freight without the necessity of causing the converter 3 to be disconnected.

When the circuit interrupter 5 is opened, by reason of the decrease in the load on the circuit 2, or by reason of the reversal of energy in the converter 3, the switch 12 will cause the trip coil 87 of the circuit interrupter 11 to be energized for the purpose of tripping the same. The circuit interrupter 5 is provided also with overload trip coils 88 for the purpose of tripping the same when an overload traverses the circuit 1.

We do not limit our invention to the particular arrangement illustrated, as it may be variously modified without departing from the spirit and scope of the invention as set forth in the appended claims.

We claim as our invention:

1. The combination with a rotary converter and a reversing switch for the field-magnet winding thereof, of a polarized relay connected to the terminals of the converter, automatic means controlled by the relay for actuating the switch into one position only when the polarity of the rotary is incorrect and a spring for normally actuating the switch into its other position.

2. The combination with a rotary converter and a spring-restrained reversing switch for the field-magnet windings thereof, of automatic means for actuating the switch against the action of its spring only when the polarity of the converter has a predetermined direction.

3. In an electrical system, the combination with a direct-current circuit and a converter, of a circuit interrupter for operatively connecting the converter to the direct-current circuit, and a single winding relay energized only by the difference in voltage between the converter and the direct-current circuit for controlling the closing of the circuit interrupter.

4. In an electrical system, the combination with an alternating-current circuit, a direct-current circuit, a rotary converter, and means for connecting the converter to the alternating-current circuit, under predetermined voltage conditions in the direct-current circuit, of means for reversing the polarity of the field winding of the converter, means for connecting the converter to the direct-current circuit, and a polarized relay for controlling the said reversing and the said connecting means.

5. In an electrical system, the combination with an alternating-current circuit, a direct-current circuit, a converter and a transformer having low and high-potential terminals thereon, of a circuit interrupter for operatively connecting the transformer to the alternating-current circuit under predetermined voltage conditions, a second circuit interrupter dependent only upon the operation of the first interrupter for operatively connecting the converter to the low-potential terminals on the transformer, a third circuit interrupter dependent only upon the operation of the second interrupter for operatively connecting the converter to the high-potential terminals on the transformer, a fourth interrupter for operatively connecting the converter to the direct-current circuit after the said third interrupter is closed, and means for so controlling the operation of the fourth interrupter that it will close only when the voltage of the converter has a predetermined value and the correct polarity.

6. In an electrical system, the combination with an alternating-current circuit, a direct-current circuit, a converter and a transformer, of a circuit interrupter for connecting the transformer to the alternating-current circuit, means for lifting the brushes on the converter and for connecting the converter to relatively low-potential taps on the transformer, when the interrupter is closed, means for connecting the converter to high-potential points on the transformer and for lowering the brushes on the converter, means for determining the polarity of the converter and for reversing the field-magnet windings of the converter if the polarity is reversed, and means for connecting the converter to the direct-current circuit when the difference between the converter voltage and the voltage of the direct-current circuit has a predetermined value.

7. In an electrical system, the combination with an alternating-current circuit, a direct-current circuit, a rotary converter, and means for connecting the converter to the alternating-current circuit, of means for causing the converter to slip a pole for the purpose of reversing its polarity, means for connecting the converter to the direct-current circuit when it has a predetermined voltage, and a single means dependent upon the polarity of the converter for controlling the operation of the pole slipping and the connecting means.

8. In a distribution system, the combination with an alternating-current circuit, a direct-current circuit and means for connecting a synchronous converter between said circuits, of means for automatically raising all but two brushes of unlike polarity, means for starting the converter that are controlled and initiated by the brush-raising means and automatic means responsive to the polarity of the two unraised brushes for controlling the lowering of the raised brushes.

9. In a distribution system, the combination with an alternating-current circuit, a direct-current circuit and means for connecting a synchronous converter between said circuits, of means for establishing starting and running connections between the alternating-current circuit and the converter, means for raising all but two brushes of unlike polarity from the commutator, means controlled by the brush-raising means for controlling the starting connections of the converter, means responsive to the polarity of the converter for controlling the running connections thereof to the alternating-current circuit and means energized upon the completion of the running connections for automatically lowering the brushes.

10. The combination with a converter and means for automatically connecting the same to an electrical system, of automatic means for raising all but two brushes of unlike polarity from the commutator of the converter before the converter is connected to the system and for lowering the brushes after the connection is effected.

11. The combination with a rotary transformer and a direct-current circuit, of a relay having a single winding connected between the rotary transformer and the direct-current circuit and energized by the difference of potential only between the transformer and the direct-current circuit to control the automatic connection of the converter to the circuit.

12. The combination with a converter, a direct-current circuit and means for automatically starting the converter under predetermined conditions in the direct-current circuit, of a relay having a single winding energized only by the potential difference between the converter and the direct-current circuit for permitting the connection of the converter to the circuit when the potential difference has a predetermined value.

13. The combination with a converter and a direct-current circuit, of a single-winding relay connected between the converter and the direct current circuit to be energized only by the potential difference therebetween to control the connection of the converter to the direct-current circuit when the difference in voltage therebetween has a predetermined value.

14. In an electrical system, the combination with an alternating-current circuit, a direct-current circuit, a transformer and a converter, of a circuit interrupter for automatically connecting the transformer to the alternating-current circuit under predetermined load conditions in the direct-current circuit, means energized upon the closing of the interrupter for automatically raising all but two brushes of unlike polarity from the commutator, a second interrupter controlled by the brush-raising means for connecting the converter to relatively low-potential terminals on the transformer, a third interrupter closed upon the development of a predetermined polarity in the converter for connecting the converter to relatively high-potential terminals on the transformer and means controlled by the closing of the third interrupter for automatically lowering the raised brushes.

15. In an electrical system, the combination with an alternating-current circuit, a direct-current circuit, a transformer and a converter, of a circuit interrupter for connecting the transformer to the alternating-current circuit under predetermined conditions in the direct-current circuit, a second interrupter controlled only by the first interrupter for connecting the converter to relatively low-potential points on the transformer, a third interrupter controlled only by the closing of the second interrupter for connecting the converter to relatively high-potential points on the transformer, a fourth interrupter for connecting the converter to the direct-current circuit, and a polarized relay responsive to the polarity of the converter and a voltage relay connected between the converter and the direct-current circuit for controlling the operation of the fourth interrupter.

16. The combination with a synchronous dynamo-electric machine and a reversing switch for the field winding thereof, of a spring for normally yieldingly holding the switch in one position, and polarity-responsive means for reversing the switch when the polarity of the machine has a predetermined direction.

17. The combination with a rotary converter, of means for automatically raising the brushes from the commutator cylinder before the converter is started, and means for automatically lowering the brushes when the converter is supplied with a predetermined voltage.

18. In an electrical system, the combination with an alternating-current circuit, a direct-current circuit, a transformer and a converter, of a circuit interrupter for connecting the transformer to the alternating-current circuit in response to a drop in voltage in the direct-current circuit, a second interrupter controlled only by the closure of the first interrupter for connecting the converter to relatively low-potential points on the transformer, a third interrupter controlled only by the closure of the second interrupter for connecting the converter to relatively high-potential points on the transformer, and means for connecting the converter to the direct-current circuit when the polarity and potential of the converter are of a predetermined direction and value.

19. In an electrical system, the combination with an alternating-current circuit, a direct-current circuit, a transformer and a converter, of a circuit interrupter for connecting the transformer to the alternating-current circuit under predetermined load conditions in the direct-current circuit, a second interrupter controlled only by the first interrupter for connecting the converter to relatively low-potential points on the transformer, a third interrupter controlled only by the closing of the second interrupter for connecting the converter to relatively high-potential points on the transformer, a fourth interrupter for connecting the converter to the direct-current circuit, and means connected to the converter and to the direct-current circuit for so controlling the fourth interrupter that it is closed only when the voltage of the converter is of a predetermined value and of correct polarity.

20. In an automatic self starting synchronous converter-system, the combination with a converter of which all but two brushes of unlike polarity are raised before the converter is directly connected across the system, of means connected to the two unraised brushes, for automatically effecting the lowering of the raised brushes after the converter is connected to the system.

21. In an automatic self starting synchronous converter system, the combination with a converter that is to be connected to a portion of the system to have part of the normal voltage impressed thereon and then to another portion of the system to have the full voltage impressed thereon, all but two brushes of unlike polarity being in a raised position during the process of connection, of means connected to the two unraised brushes for automatically effecting the lowering of the brushes when the converter is connected to have the full voltage of the system impressed thereon.

22. The combination with a rotary converter, of means for raising all but two brushes of unlike polarity from the commutator, means responsive to the polarity of the two brushes for reversing the excitation of the converter if the polarity is incorrect and for subsequently effecting the lowering of the brushes after the polarity is determined to be correct.

23. The combination with a rotary converter, of means for raising all but two brushes of unlike polarity from the commutator, a polarized relay responsive to the polarity of the two unraised brushes for reversing the excitation of the converter if the polarity is incorrect and for subsequently effecting the automatic lowering of the brushes after the polarity is determined to be correct.

24. The combination with an alternating-current circuit, a transformer, a rotary converter and means for automatically connecting the converter to relatively low-potential and relatively high-potential terminals of the transformer windings, of means for automatically raising all but two brushes of unlike polarity from the commutator of the converter before the converter is connected to the high-potential terminals of the transformer and for automatically lowering those brushes after the converter is connected to said terminals.

25. The combination with an alternating-current circuit, a transformer having relatively low-potential and relatively high-potential terminals, a rotary converter and means for connecting the converter to the several terminals, and means whereby all but two brushes of unlike polarity are raised from the commutator before the connection to the high-potential terminals, of means for automatically lowering the raised brushes when the converter is connected to the high-potential terminals.

26. In an automatic synchronous converter substation, the combination with an alternating-current circuit, a converter, a direct-current circuit, means for applying a reduced voltage to the converter to start the same and for then applying the full voltage of the alternating-current circuit thereto, and means for then connecting the converter to the direct-current circuit, of means for raising all but two brushes of unlike polarity from the commutator while the converter is being started to preclude flashing thereon, means responsive to the polarity of the unraised brushes for controlling the lowering of the raised brushes and means for controlling each operation in accordance with the completion of the preceding operation in a predetermined sequence.

27. The combination with a circuit and a rotary converter that shall have a predetermined polarity before being connected thereto, of a reversing switch for the field-magnet winding of the converter that is normally biased to one position and means responsive to the polarity of the converter for actuating the switch to another position when the polarity of the converter is reversed.

28. The combination with a synchronous dynamo-electric machine and a reversing switch for the field winding thereof, of means for normally yieldingly holding the switch in one position and polarity responsive means for reversing the switch when the polarity of the machine has a predetermined direction.

29. The combination with a rotary converter, of a reversing switch for the field-magnet winding of the converter that is normally biased to one position, and automatic means for actuating the reversing switch to another position only when the polarity of the converter is incorrect.

30. In a distribution system, the combination with an alternating-current circuit, a synchronous dynamo-electric machine having a field winding and adapted to be connected to the alternating-current circuit, and means for consecutively applying a reduced voltage and the normal voltage of the circuit to the machine windings, of means for controlling the application of the normal voltage in accordance with the excitation of the field winding of the machine.

31. In a distribution system, the combination with an alternating-current circuit, a synchronous dynamo-electric machine having a field winding and adapted to be connected to the alternating-current circuit, and means for consecutively applying a reduced voltage and the normal voltage of the circuit to the machine windings, of means responsive to the excitation of the field winding of the machine for controlling the normal-voltage-applying means.

32. In a distribution system, the combination with an alternating-current circuit, a synchronous dynamo-electric machine having a field winding and adapted to be connected to the alternating-current circuit, and means for consecutively applying a reduced voltage and the normal voltage of the circuit to the machine windings, of means responsive to the direction of current traversing the field winding of the machine for controlling the normal-voltage-applying means.

33. In a distribution system, the combination with an alternating-current circuit, a synchronous dynamo-electric machine having a field winding and adapted to be connected to the alternating-current circuit, and means for consecutively applying a reduced voltage and the normal voltage of the circuit to the machine windings, of means energized in accordance with the field current for controlling the normal-voltage-applying means.

34. In a distribution system, the combination with an alternating-current circuit, a synchronous converter having a field winding and adapted to be connected to the alternating-current circuit, and means for consecutively applying a reduced voltage and the normal voltage of the circuit to the converter windings, of means responsive to the polarity of the converter for controlling the normal-voltage-applying means.

35. In a distribution system, the combination with an alternating-current circuit, a synchronous converter having a field winding and adapted to be connected to the alternating-current circuit, and means for consecutively applying a reduced voltage and the normal voltage of the circuit to the converter windings, of means energized in accordance with the polarity of the converter for controlling the normal-voltage-applying means.

36. In a distribution system, the combination with an alternating-current circuit, a synchronous converter having a field winding and adapted to be connected to the alternating-current circuit, and means for consecutively applying a reduced voltage and the normal voltage of the circuit to the converter windings, of a polarized relay responsive to the polarity of the converter for controlling the actuation of the normal-voltage-applying means.

37. In a distribution system, the combination with an alternating-current circuit, a synchronous converter having a field winding and adapted to be connected to the alternating-current circuit, and means for consecutively applying a reduced voltage and the normal voltage of the circuit to the converter windings, of a polarized relay connected to the converter for controlling the actuation of the normal-voltage-applying means.

38. The combination with an alternating-current circuit, a direct-current circuit and a synchronous converter, of automatic means for starting the converter from the alternating-current circuit to permit the development of the polarity thereof at random, reversing the polarity if it should develop in a direction opposite to a predetermined polarity, and completing the normal connections between the alternating-current circuit and the converter, and then connecting the converter to the direct-current circuit.

39. The combination with an alternating-current circuit, a direct-current circuit and a synchronous converter, of automatic means for starting the converter from the alternating-current circuit to permit the development of the polarity thereof at random, reversing the polarity if it should develop in a direction opposite to a predetermined polarity, and completing the normal connections between the alternating-current circuit and the converter, and means for connecting the converter to the direct-current circuit.

40. The combination with an alternating-current-supply circuit and a synchronous converter, of means responsive to the polarity of the direct-current end of the converter for controlling the connections of the converter to the supply circuit.

41. The combination with an alternating-current circuit and a synchronous converter, of means responsive to the electrical condition of the direct-current end of the converter for controlling the connection of the converter to the alternating-current circuit.

42. The combination with an alternating-current circuit, a direct-current circuit and a synchronous converter adapted to be connected therebetween, of means responsive to the polarity of the converter for controlling the connection of the converter to the alternating-current and the direct-current circuits.

43. In an electric system, the combination with an alternating current circuit, a direct-current circuit, and a synchronous converter, of means for connecting the converter between the two circuits, automatic means for controlling the polarity of the converter by the shunt field winding and for always eventually connecting the winding to the brushes of the converter in the same direction and means operative upon the development of a predetermined polarity for controlling the connecting means.

44. The combination with an alternating-current circuit, a direct-current circuit and a synchronous converter, of means for connecting the converter therebetween, and automatic means responsive to the polarity of the converter for controlling the converter to develop a predetermined polarity and for controlling said connecting means.

45. The combination with an alternating-current circuit, a direct-current circuit and a self-excited synchronous converter provided with a shunt field winding and adapted to be connected therebetween, of means for controlling the development of a predetermined polarity while energizing the field winding from the commutator of the converter only and for controlling the connection of the converter between the two circuits.

46. In a power-distributing system, the combination with a synchronous converter adapted to be connected between an alternating-current circuit and a direct-current circuit, of two circuit-controlling devices connected between the direct-current end of the converter and the direct-current circuit, each circuit-controlling device being provided with an operating coil and the coil of one of the devices being energized from the alternating-current circuit of the system.

47. In a power-distributing system, the combination with a synchronous converter adapted to be connected between an alternating-current circuit and a direct-current circuit, and a shunt field winding for the converter, of means for connecting the winding to the converter comprising an operating coil, and means whereby the operating coil of said connecting means is energized from the alternating-current circuit to which the converter is connected.

48. In a power-distributing system, the combination with a synchronous converter adapted to be connected between an alternating-current circuit and a direct-current circuit, and a shunt field winding for the converter, of means for connecting the converter to the alternating-current circuit, means responsive to the polarity of the converter for effecting the actuation of the connecting means if the polarity is in a predetermined direction and for changing the excitation of the shunt field winding if the polarity is in the opposite direction.

49. In an electrical system, the combination with an alternating-current circuit, a direct-current circuit and a synchronous converter to be connected therebetween, of means for consecutively applying a reduced voltage and the normal voltage of the alternating-current circuit to the converter, and automatic means for controlling the energization of the field winding of the converter from the commutator thereof to develop a predetermined polarity therein while the reduced voltage is applied to the converter, and for controlling the subsequent application of the normal voltage thereto.

50. The combination with a synchronous converter provided with a shunt field winding and adapted to be connected between an alternating-current circuit and a direct-current circuit, of means for applying a reduced voltage for starting the converter from rest and for applying normal voltage thereto, said means being dependent upon the converter attaining synchronous speed, a predetermined polarity and predetermined conditions in the shunt field winding.

51. The combination with an alternating-current circuit, a direct-current circuit, a synchronous converter and means for connecting the converter between both circuits, of means for raising all but two brushes of unlike polarity from the commutator of the converter and means for precluding the connection of the converter to the alternating-current circuit until said brushes are raised.

52. The combination with an alternating-current circuit, a direct-current circuit, a synchronous converter and means for connecting the converter between both circuits, of means for raising all but two brushes of unlike polarity from the commutator of the converter and means for precluding the connection of the converter to the direct-current circuit until said brushes are lowered.

53. The combination with a rotating machine operated by alternating-current energy and provided with a commutator cylinder embodying a plurality of segments, and a plurality of brushes for transferring current between the segments and an external circuit, of an electromagnetic device comprising a member movable in two directions and two windings for controlling the direction of the movement of said member, automatically controlled switching means for controlling the circuits of said windings and a limit switch for also controlling the circuits of said windings to prevent movement of the movable member beyond predetermined limits.

54. The combination with a rotating machine operated by alternating-current energy and provided with a commutator cylinder embodying a plurality of segments, and a plurality of brushes for transferring current between the segments and an external circuit, of an electromagnetic device comprising a member movable in two directions and two windings for controlling the direction of the movement of said member, automatically controlled switching means for controlling the circuits of said windings and a limit switch controlled by the movable member of said electromagnetic device to control the circuits of the operating windings.

55. The combination with a rotating translating apparatus embodying a commutator cylinder provided with a plurality of segments, and a plurality of current-conducting means for transferring current between the segments and an external circuit, of normally de-energized means, automatically initiated in response to external conditions that are to be controlled by the apparatus, for controlling the relative positions of the current-conducting means and the surface of the commutator cylinder.

56. The combination with a rotating translating apparatus embodying a commutator cylinder provided with a plurality of segments and a plurality of brushes for engaging the commutator surface, of means for controlling the relative positions of the brushes and the commutator cylinder, electromagnetic means adapted to be energized in response to external conditions and comprising a member movable in two directions, and means operatively connected between the brush-controlling means and the movable member of the electromagnetic means to actuate the brush-controlling means.

57. The combination with a rotating translating apparatus embodying a commutator cylinder provided with a plurality of segments and a plurality of brushes for engaging the commutator surface and serving as current-transferring means between the commutator and an external circuit, of a movable supporting member for a plurality of the brushes, an electromagnetic device comprising a member movable in two directions and a plurality of windings for controlling the direction of said movement, and a switch device controlled by the movable member to control the circuits of said windings.

58. The combination with a rotating translating apparatus embodying a commutator cylinder provided with a plurality of segments and a plurality of brushes for engaging the commutator surface, of a movable supporting member for the brushes, an electromagnetic device comprising a member actuable in two directions and a plurality of windings for controlling the movement of said member, a switching device for controlling the circuits of said windings and means operatively connected between the actuable member of the electromagnetic device and both the brush supporting member and the switching device for controlling the respective positions thereof.

59. In an electrical system, the combination with an alternating-current circuit, a direct-current circuit and a converter, of means for automatically connecting the converter to the alternating-current circuit under predetermined conditions, and means responsive to the polarity of the converter for controlling the connection thereof to the direct-current circuit always in the same manner.

60. In an electrical system, the combination with an alternating-current circuit, a direct-current circuit and a converter, of means for automatically controlling the connection of the converter to the alternating-current circuit under predetermined conditions, and means responsive to the polarity of the converter for controlling the converter to cause the polarity to be of a predetermined direction and for controlling the connection of the converter to the direct-current circuit always in the same manner.

61. A control system for starting a synchronous converter comprising means for starting the converter from its alternating-current end and developing a predetermined polarity at its direct-current end, said means comprising relay-controlled means operative in a predetermined sequence, and provided with operating windings and switches, and means for connecting the switches and the operating windings of the succeeding means in the predetermined sequence to cause the energization and consequent actuation of the several means directly upon the actuation of the preceding means in the predetermined sequence.

62. In an electrical system, the combination with an alternating-current circuit, a direct-current circuit and a synchronous converter for translating energy therebetween, of relay-controlled means operative in a predetermined sequence for controlling the development of a predetermined polarity and the connection of the converter between the two circuits, in which sequence the respective means are dependent for their operation only upon the completion of the operation of the preceding means in said sequence.

63. In an electrical system, the combination with an alternating-current circuit, a direct-current circuit and a synchronous converter for translating energy therebetween, of relay-controlled means operative in a predetermined sequence for controlling the development of a predetermined polarity in the converter and the connection thereof between the two circuits, in which sequence the respective means are dependent for their operation only upon the completion of the operation of the preceding means in said sequence, said relay-controlled means being provided with operating windings and switches and the switches of the respective means being connected to the winding of the succeeding means to cause the immediate energization thereof and the consequent actuation of the associated switch directly upon the actuation of the preceding means in the predetermined sequence.

64. In an electrical system, the combination with an alternating-current circuit, a direct-current circuit and a synchronous converter to be connected therebetween, of means for consecutively applying a reduced voltage and the normal voltage of the alternating-current circuit to the converter, means energized from the converter for developing a predetermined polarity in the converter while the converter is subjected to the reduced voltage, and means responsive to a condition of the direct-current end for controlling the application of the normal voltage to the converter.

65. In an electrical system, the combination with an alternating-current circuit, a direct-current circuit, a converter for translating energy therebetween and a transformer provided with main and low-potential terminals, of means for connecting the transformer to the alternating-current circuit, means for connecting the converter windings to the low-potential terminals of the transformer, means whereby the commutator brushes are maintained in raised position while the converter windings are connected to the low-potential terminals, means for determining the polarity of the converter and for reversing the polarity if it be other than a predetermined polarity and means for subsequently connecting the converter windings to the main terminals of the transformer and for lowering the brushes to the commutator cylinder.

66. A control system for starting a synchronous converter from its alternating-current end and developing a predetermined polarity at its direct-current end, comprising means for applying a relatively low-potential electro-motive force to start the converter and accelerate it to synchronous speed, means for controlling the direction of excitation of the shunt field winding from the converter commutator while the converter windings are subjected to the low-potential force and means responsive to a condition of the direct-current end for controlling the subsequent application of the normal operating potential force to the converter windings.

67. A control system for starting a synchronous converter from its alternating-current end and developing a predetermined polarity at its direct-current end while energizing the shunt field winding from the direct-current end, comprising means for applying a relatively low-potential force to the windings to start the converter and accelerate it to synchronous speed, means for controlling the direction of energization of the shunt field winding from the direct-current end of the converter to develop the predetermined polarity and means for subsequently applying the normal operating potential force to the converter windings.

68. A control system for starting a synchronous converter from its alternating-current end and developing a predetermined polarity at its direct-current end while energizing the shunt field winding from the direct-current end, comprising means for applying a relatively low-potential force to the windings to start the converter and accelerate it to synchronous speed, means for controlling the direction of energization of the shunt field winding from the direct-current end of the converter to develop the predetermined polarity and means responsive to a condition of the direct-current end of the converter for controlling the application of the normal operating potential force to the converter windings.

69. A control system for starting a synchronous converter from its alternating-current end and developing a predetermined polarity at its direct-current end by energizing the shunt field winding from the direct-current end, comprising means for applying a relatively low-potential force to the windings to start the converter, means for controlling the energization of the shunt field winding from the direct-current end of the converter to always ultimately energize the winding in a predetermined direction, and means connected to the direct-current end of the converter for subsequently controlling the application of normal operating voltage to the converter windings.

70. The combination with a synchronous converter provided with a shunt field winding and means for consecutively applying electromotive forces of reduced and of normal values to the converter, of means for controlling the development of a predetermined polarity in the converter while the reduced electromotive force is applied thereto comprising means for controlling the direction of the current that may traverse the shunt field winding, and means responsive to voltage of a predetermined polarity developed by the converter for rendering ineffective the means for applying the reduced electromotive force and for rendering operative the means for applying the normal value of electromotive force.

71. In an electrical system, the combination with an alternating-current circuit, a direct-current circuit and a synchronous converter, of means for applying a relatively small electromotive force to the converter to start the same and to permit the converter to develop chance polarity, means operative when other than a predetermined polarity is developed for controlling the excitation of the field winding to effect the development of the predetermined polarity, and means for subsequently rendering inoperative the means for applying the small electro-motive force to the converter and for controlling the application of the normal operating electromotive force to the converter.

72. In an electrical system, the combination with an alternating-current circuit, a direct-current circuit and a synchronous converter to be connected therebetween, of a transformer, a circuit interrupter between the alternating-current circuit and the primary windings thereof, two switching devices between the secondary windings of the transformer and the armature windings of the converter for respectively applying a reduced electromotive force and the normal electromotive force to the armature windings, and means operative while the reduced electromotive force is applied to the converter for controlling the excitation of the shunt field winding to effect the development of a predetermined polarity and for controlling the application of the normal operating electromotive force to the windings when the predetermined polarity is established.

73. In an electric system, the combination with an alternating-current circuit, a direct-current circuit and a rotary transformer to be connected therebetween, of means for starting the converter by energy from the alternating current circuit applied to the alternating-current end of the converter and for developing a predetermined polarity at the direct-current end of the converter, corresponding to the polarity of the direct-current circuit, by controlling the direction of energization of the shunt field winding of the converter from the direct-current end of the converter.

74. In an electrical system, the combination with an alternating-current circuit, a direct-current circuit, a synchronous converter to translate energy therebetween, and a power transformer provided with low-potential and main terminals between the alternating-current circuit and the converter, of means for connecting the alternating-current circuit to the transformer, means for connecting the low-potential terminals to the converter windings, means connected to the direct-current end of the converter for controlling the development of a predetermined polarity in the converter, means for connecting the main terminals to the converter windings after the polarity of the converter is established, means for then connecting the direct-current end of the converter to the direct-current circuit and means associated with the respective connecting means for rendering said connecting means operative dependent solely upon the correct and complete operation of the next preceding connecting means.

75. In an electrical system, the combination with an alternating-current circuit, a direct-current circuit, a synchronous converter to translate energy therebetween, and a power transformer provided with low-potential and main terminals between the alternating-current circuit and the converter, of means for connecting the alternating-current circuit to the transformer, means for connecting the low-potential terminals to the converter windings, means connected to the direct-current end of the converter, for then controlling the converter to develop a predetermined polarity, means for then connecting the main terminals of the transformer to the converter windings, means for subsequently connecting the direct-current end of the converter to the direct-current circuit, and relay devices for controlling said aforementioned means in the recited sequence dependent only upon the proper completion of the operation of the next preceding means.

76. In an electrical system, the combination with an alternating-current circuit, a direct-current circuit and a synchronous converter, of means for applying a reduced electromotive force to the converter windings to start the converter, means operative while the converter is subjected to the reduced electromotive force to constitute a standard of polarity, means energized from the direct-current end of the converter and co-operating with the standard of polarity to control the excitation of the shunt field winding to cause the development of a predetermined polarity in the converter and for controlling the subsequent application of normal operating electromotive force to the converter windings.

77. In an electrical system, the combination with an alternating-current circuit, a direct-current circuit and a synchronous converter, of means for applying a reduced electromotive force to the converter windings to start the converter, means operative while the converter is subjected to the reduced electromotive force to constitute a standard of polarity, means energized from the direct-current end of the converter and co-operating with the standard of polarity to control the excitation of the shunt field winding and means operative after the development of a predetermined polarity in the converter for controlling the subsequent application of normal operating electromotive force to the converter windings.

78. A control system for starting a synchronous converter from its alternating-current end and developing a predetermined polarity at its direct-current end, comprising means for applying a relatively low potential force to start the converter, switching means for controlling the direction of excitation of the shunt field winding, means connected to the direct-current end of the converter for controlling said switching means and means operative when the shunt field winding is ultimately connected to the converter in a predetermined manner and energized therefrom in a predetermined direction for rendering the low-voltage means ineffective and for controlling the application of normal operating electromotive force to the converter windings.

79. In an electrical system, the combination with an alternating-current circuit, a direct-current circuit, a synchronous converter and a transformer having low and high potential terminals thereon, of a circuit interrupter for connecting the transformer to the alternating-current circuit, a second circuit interrupter dependent only upon the operation of the first interrupter for operatively connecting the converter to the low-potential terminals of the transformer, means connected to the converter for controlling the development of a predetermined polarity, a third circuit interrupter dependent upon the operation of the second interrupter and the development of a predetermined polarity in the converter for operatively connecting the converter to the high-potential terminals of the transformer, a fourth interrupter for connecting the converter to the direct-current circuit and means dependent upon the operation of the third interrupter for controlling the operation of the fourth interrupter.

80. In an electrical system, the combination with an alternating-current circuit, a direct-current circuit, a converter and a transformer having low and high potential terminals thereon, of a circuit interrupter for operatively connecting the transformer to the alternating-current circuit, a second circuit interrupter dependent only upon the operation of the first interrupter for operatively connecting the converter to the low potential terminals on the transformer, means connected to the converter for controlling the development of a predetermined polarity in the converter, a third circuit interrupter dependent only upon the operation of the second interrupter for operatively connecting the converter to the high-potential terminals on the transformer, a fourth interrupter for operatively connecting the converter to the direct-current circuit after the said third interrupter is closed, and means for so controlling the operation of the fourth interrupter that it will close only when the voltage of the converter has a predetermined value and the correct polarity.

81. In an electrical system, the combination with an alternating-current circuit, a direct-current circuit, a transformer and a converter, of a circuit interrupter for connecting the transformer to the alternating-current circuit, a second interrupter controlled only by the closure of the first interrupter for connecting the converter to relatively low-potential points on the transformer, means connected to the direct-current end of the converter for controlling the development of a predetermined polarity in the converter, a third interrupter controlled only by the closure of the second interrupter for connecting the converter to relatively high-potential points on the transformer, and means for connecting the converter to the direct-current circuit when it has the correct polarity.

82. In an electrical system, the combination with an alternating-current circuit, a direct-current circuit, a converter and a transformer having low and high potential terminals thereon, of a circuit interrupter for operatively connecting the transformer to the alternating-current circuit, a second circuit interrupter dependent only upon the operation of the first interrupter for operatively connecting the converter to the low-potential terminals on the transformer, means connected to the converter for controlling the development of a predetermined polarity in the converter, a third circuit interrupter dependent only upon the operation of the second interrupter for operatively connecting the converter to the high-potential terminals on the transformer, a fourth interrupter for operatively connecting the converter to the direct-current circuit after the said third interrupter is closed, and means for so controlling the operation of the fourth interrupter that it will close only when the voltage of the converter has a predetermined polarity.

83. In an electrical system, the combination with an alternating-current circuit and a rotary transformer to be energized therefrom, of means for applying relatively low-potential electromotive force to start the transformer, means for applying normal operating electromotive force to the transformer, a relay for controlling the starting means, a relay for controlling the normal operating means, a transfer relay for controlling said control relays and means responsive to the polarity of the rotary transformer for controlling the operation of the transfer relay.

84. In an electrical system, the combination with an alternating-current circuit and a rotary transformer to be energized therefrom, of means for applying relatively low-potential electromotive force to start the transformer, means for applying normal operating electromotive force to the transformer, a relay for controlling the normal operating means, a transfer relay for controlling the starting means and the control relay associated with the normal operating means, and means energized in accordance with the polarity of the direct-current end of the rotary transformer for controlling the transfer relay.

In testimony whereof, we have hereunto subscribed our names this 25th day of Sept., 1916.

FREDERIC C. HANKER.
CHARLES McL. MOSS.